D. Wingenroth,
Manure Fork.
No. 87,812.   Patented Mar. 16 1869
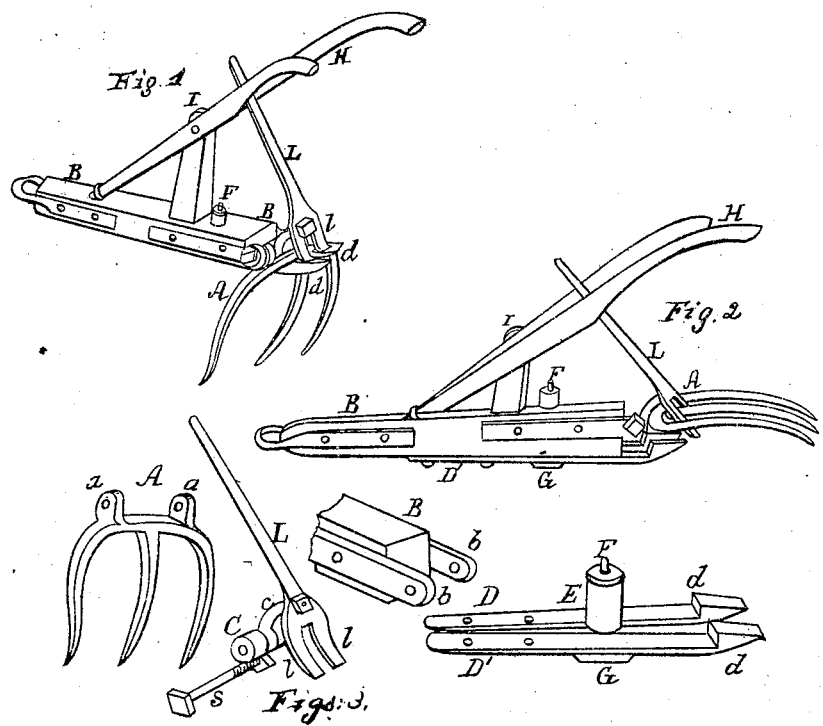
Witnesses
Henry B Nagl
Wm K Fetter
Inventor
Daniel Wingenroth

United States Patent Office.

DANIEL WINGENROTH, OF EPHRATAH, PENNSYLVANIA.

Letters Patent No. 87,812, dated March 16, 1869.

IMPROVEMENT IN MANURE-DRAGS.

The Schedule referred to in these Letters Patent and making part of the same.

*To all whom it may concern:*

Be it known that I, DANIEL WINGENROTH, of Ephratah, in the county of Lancaster, and State of Pennsylvania, have invented a new and useful Improvement on Manure-Drags; and I do hereby declare that the following is a full, clear, and exact description of the construction and operation of the same, reference being had to the accompanying drawings, making a part of this specification, in which—

Figure 1 is a perspective view, with the fork vertical, for grasping and dragging the manure.

Figure 2, a side view, with the fork horizontal, when discharging its load.

Figures 3 are detached portions of the same.

The nature of my invention consists in the arrangement of the hook and lever on one axis, or shaft, and a pair of notched springs for holding and disengaging the drag by means of a forked lever, all combined on the end of a single beam.

To enable others skilled in the art to make and use my invention, a brief reference to the several illustrations will be sufficient.

The stout beam, B, has a string-plate, $b$, on each side, extending beyond the rear, with a hole in each, for a headed bolt fastened with a nut.

The fork A is four-cornered at top, and has two perforated lugs, or ears, for the same bolt.

The lever L is forked at the end, to give play for the central tine of the hook, shown by $l\,l$, and is connected above the slot by an arm, $c$, to a perforated ferrule, C, also for said bolt.

Below the beam, B, is a pair of springs, D D′, provided with shoulders, $d\,d$, against which the upper square, or cornered portion of the fork rests, and is held, by inserting the fork A and the ferrule C between the lugs $a$, and entering the headed screw-bolt $s$, through the side bearing $b$, and through the lugs $a$, and ferrule C, and opposite bearing $b$, and securing all with a screw-nut, all is ready for operation.

I also use a headed bolt, G, entering from beneath the beam B, between the springs D D, and passing through stout gutta-percha set in a cavity made in the beam, and secured above with a washer and a nut, as a counter-check, both to relieve the under pair of springs, or prevent undue strain upon the screw-bolts by which they are fastened.

A stout coiled spring may be substituted gutta-percha, but is deemed an equivalent.

Otherwise I claim no novelty in the handles and parts employed.

I am aware of the several patents for manure-drags, but find no arrangement substantially as here presented.

These handles may be made so as to be easily detached, when the same arrangement will answer for elevating hay, by simply having an eye on the end of the lever, for a cord, and in that form, is equally novel and useful.

The operation differs from other drags, so that by drawing the lever toward you, the double and shouldered springs are depressed, and allow the fork to turn on its bolt or pivot, and discharge itself. When discharged, it can be dragged back, in the position of fig. 2. By simply elevating the handles or beam, the fork swings over the sliding spring-catch, and is again locked in a vertical position, ready for another load.

What I claim as my invention, and desire to secure by Letters Patent, is—

A manure-drag, so combined and arranged, that the two lugs $a$, on the hook A, and ferrule C, which forms the fulcrum of the lever L, are all held and operated on a single stout screw-bolt, $s$, in side bearings $b$, on the end of a beam, B, in the manner and for the purpose specified.

DANIEL WINGENROTH.

Witnesses:
 HENRY R. NAGLE,
 WM. K. SELTZER.